(12) United States Patent
Beister et al.

(10) Patent No.: US 12,544,029 B2
(45) Date of Patent: Feb. 10, 2026

(54) METHOD AND APPARATUS FOR RECONSTRUCTING IMAGES VIA APPARATUS RECORDING PARAMETERS

(71) Applicant: Siemens Healthcare GmbH, Erlangen (DE)

(72) Inventors: Marcel Beister, Erlangen (DE); Ludwig Ritschl, Buttenheim (DE); Steffen Kappler, Effeltrich (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 732 days.

(21) Appl. No.: 17/481,412

(22) Filed: Sep. 22, 2021

(65) Prior Publication Data

US 2022/0096033 A1   Mar. 31, 2022

(30) Foreign Application Priority Data

Sep. 30, 2020  (DE) .................. 10 2020 212 382.9

(51) Int. Cl.
| | |
|---|---|
| *A61B 6/00* | (2024.01) |
| *A61B 6/02* | (2006.01) |
| *A61B 6/03* | (2006.01) |

(52) U.S. Cl.
CPC .......... *A61B 6/5205* (2013.01); *A61B 6/025* (2013.01); *A61B 6/032* (2013.01); *A61B 6/5211* (2013.01)

(58) Field of Classification Search
CPC ....... A61B 6/5205; A61B 6/025; A61B 6/032; A61B 6/5211; A61B 6/502
See application file for complete search history.

(56) References Cited

U.S. PATENT DOCUMENTS

| | | | |
|---|---|---|---|
| 2009/0034818 A1 | 2/2009 | Morita | |
| 2012/0045108 A1 | 2/2012 | Shechter | |
| 2014/0369577 A1 | 12/2014 | Collins et al. | |
| 2016/0120503 A1* | 5/2016 | Tsushima | G01S 15/8915 367/7 |
| 2016/0300368 A1* | 10/2016 | Flohr | G06T 11/005 |
| 2016/0334520 A1* | 11/2016 | Flohr | G06T 11/008 |
| 2017/0154444 A1* | 6/2017 | Kobayashi | A61B 6/037 |
| 2017/0231589 A1* | 8/2017 | Fujii | A61B 6/032 378/20 |
| 2017/0286598 A1* | 10/2017 | Noordvyk | G16H 50/50 |
| 2018/0192977 A1* | 7/2018 | Jin | G01V 5/22 |

(Continued)

FOREIGN PATENT DOCUMENTS

JP          H07385 A        1/1995

OTHER PUBLICATIONS

German Office Action mailed Jun. 7, 2021.

*Primary Examiner* — Benjamin O Dulaney
(74) *Attorney, Agent, or Firm* — Harness, Dickey & Pierce, P.L.C.

(57) ABSTRACT

A method is for reconstructing an image from recording data. In an embodiment, the method includes providing or measuring recording parameters with which the recording data was created; generating a preprocessing filter for the recording data based on the recording parameters; prefiltering the recording data with the preprocessing filter, to create prefiltered recording data; and reconstructing the image from the prefiltered recording data. A prefilter-generating unit, an apparatus corresponding to the method, a control facility and an image-taking system are also disclosed.

22 Claims, 3 Drawing Sheets

(56) References Cited

U.S. PATENT DOCUMENTS

| | | | | |
|---|---|---|---|---|
| 2019/0090826 A1* | 3/2019 | Carmi | ............... | A61B 6/5217 |
| 2019/0231296 A1* | 8/2019 | Jackson | ............... | A61B 6/488 |
| 2019/0311507 A1* | 10/2019 | Hasegawa | ............ | A61B 6/5258 |
| 2019/0340735 A1* | 11/2019 | Nishina | .................. | G06T 5/73 |
| 2020/0163638 A1* | 5/2020 | Wicklein | ............ | G06T 11/008 |
| 2022/0126117 A1* | 4/2022 | Voronenko | ........... | A61N 5/1084 |
| 2022/0409159 A1* | 12/2022 | Freiman | ............... | A61B 6/032 |

* cited by examiner

METHOD AND APPARATUS FOR RECONSTRUCTING IMAGES VIA APPARATUS RECORDING PARAMETERS

PRIORITY STATEMENT

The present application hereby claims priority under 35 U.S.C. § 119 to German patent application number DE102020212382.9 filed Sep. 30, 2020, the entire contents of which are hereby incorporated herein by reference.

FIELD

Example embodiments of the invention generally relate to a method and an apparatus for reconstructing images, in particular medical-technology images, images for material testing or generally for reconstructions which reconstruct a volume from single images via a complete (or also partial) 3D reconstruction. The invention preferably relates to a dynamic and dual filter concept for the reconstruction of tomosynthesis recordings or computed tomography recordings.

BACKGROUND

Some medical imaging methods generate data from which three-dimensional images can be created. Examples of these include computed tomography or tomosynthesis. The image recordings are generally generated by the relative movement of an X-ray detector and an X-ray tube, for example with a fixed X-ray detector and a moving X-ray tube, or by moving, for example rotating, both elements.

In the reconstruction of slice images from a tomosynthesis recording, for example images with different image characteristics due to the recording geometry (for example oblique radiation of X-rays) or the recording parameters (for example duration of exposure, dose) are offset against one another. As a result, the resulting spatial resolution varies with each slice resulting in non-optimum image quality.

Furthermore, with conventional reconstructions, a specific and fixed flavor is generated which cannot be configured or changed by the user or at least requires a new reconstruction to be performed for its generation.

SUMMARY

To date, the inventors have discovered that projection recordings have mostly only been convolved with a fixed filter kernel and preprocessed before reconstruction. The inventors have further discovered that there is not any compensation of the different spatial resolution in the reconstructed slice images. To date, no different or individual flavor has been provided and this is only possible with a second reconstruction.

At least one embodiment of the present invention provides an improved method and a corresponding apparatus for reconstructing images, in particular medical-technology images, images for material testing or generally for reconstructions, which reconstruct a volume from single images via a complete (or also partial) 3D reconstruction and in particular also for controlling a computed tomography system or tomosynthesis system with which at least one of the above-described disadvantages are reduced or even avoided.

Embodiments are idrected to a method, a prefilter-generating unit, an apparatus, a control facility and an image-taking system.

The method according to an embodiment of the invention comprises:
  Providing or measuring recording parameters with which the recording data was created;
  Generating a preprocessing filter for the recording data based on the recording parameters;
  Prefiltering the recording data with the preprocessing filter; and
  Reconstructing an image from the prefiltered recording data.

The apparatus according to an embodiment of the invention for reconstructing (in particular medical-technology) images from recording data comprises:
  A data interface designed to receive recording data and recording parameters with which the recording data was created;
  A prefilter-generating unit designed to generate a preprocessing filter for the recording data based on the recording parameters;
  A prefilter unit, designed to prefilter the recording data with the preprocessing filter; and
  A reconstruction unit designed to reconstruct an image from the prefiltered recording data.

An image-taking system according to at least one embodiment of the invention is based on the principle of tomography (and is in particular a tomosynthesis system or a computed tomography system) and comprises a control facility according to at least one embodiment of the invention.

A method, according to an embodiment, for reconstructing an image from recording data, comprises:
  providing or measuring recording parameters with which the recording data was created;
  generating a preprocessing filter for the recording data based on the recording parameters;
  prefiltering the recording data with the preprocessing filter, to create prefiltered recording data; and
  reconstructing the image from the prefiltered recording data.

A filter-generating unit of an embodiment is in a form of:
  a prefilter-generating unit to generate a preprocessing filter designed to process recording parameters with which recording data was created and to create preprocessing filters for the recording data (A) based on the recording parameters, or
  a postfilter-generating unit to generate a postprocessing filter to process at least one of recording parameters, with which the recording data was created, and data for flavors and to create postprocessing filters for reconstructed images.

An apparatus for reconstructing an image from recording data of an embodiment, comprises:
  a data interface to receive recording data and recording parameters with which the recording data was created;
  a prefilter-generating unit to generate a preprocessing filter for the recording data based on the recording parameters;
  a prefilter unit to prefilter the recording data with the preprocessing filter, to create prefiltered recording data; and
  a reconstruction unit to reconstruct the image from the prefiltered recording data.

A control facility of an embodiment for controlling an image-taking system, comprises the apparatus of an embodiment.

An image-taking system of an embodiment, comprises the control facility of an embodiment.

A non-transitory computer program product of an embodiment stores a computer program, directly loadable into a computing system, including program sections for executing all the method of an embodiment when the computer program is executed in the computing system.

A non-transitory computer-readable medium of an embodiment stores program sections, readable and executable by at least one processor, to execute the method of an embodiment when the program sections are executed by the at least one processor.

BRIEF DESCRIPTION OF THE DRAWINGS

The invention is described again in more detail below with reference to the attached figures and with reference to example embodiments. Herein, the same components are provided with identical reference numbers in the different figures. The figures are not generally true to scale. In the figures.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The method according to an embodiment of the invention is used to reconstruct (in particular medical-technology) images from recording data. This recording data can be raw data or conditioned raw data with which machine-specific effects such as, for example, defective pixels, afterglow or uneven illumination have already been corrected. In general, "recording data" should be understood as meaning non-reconstructed image recordings.

The method according to an embodiment of the invention can in principle be used for all types of reconstruction that can be used to reconstruct a volume from individual images via a complete or partial 3D reconstruction. Such reconstructions are sufficiently well known in the prior art and are standard when creating images from tomographic data. In the following, tomosynthesis is frequently mentioned as an example of the recording method, but this does not exclude general applicability to other recording methods, for example computed tomography methods.

The method according to an embodiment of the invention comprises:

Providing or measuring recording parameters with which the recording data was created.

During the acquisition of the recording data by an image-taking system (which could also be referred to as an image recording system), for example a CT system or a tomosynthesis system, it is necessary to make presettings such as, for example, tube voltage, beam intensity or angular velocity (see also the explanations below). These are the recording parameters that can be provided, for example by adopting the data for presetting, or can be measured, for example by an additional detector that measures the beam intensity. The recording parameters are present in the form of parameter values.

Generating a preprocessing filter for the recording data based on the recording parameters.

The basic structure of such filters is known in the prior art. In English, the term "kernel" is used for these filters or more complete terms are used for the filters. Hereinafter, the term "kernel" will be used. Examples of filters could be "base kernel" filters, "geometry kernel" filters or moiré filters. Since reconstruction generally at least partially takes place in the frequency domain, many filters act on frequencies by amplifying different frequencies differently (including attenuation in the form of negative amplification).

One special feature of the invention is the fact that the preprocessing filter is generated dynamically, i.e., based on the respective recording parameters of the image recording, and not statically, i.e., fixed. It is of course possible to use a plurality of preprocessing filters, but at least one of them must have been created dynamically.

Prefiltering the recording data with the preprocessing filter.

Prefiltering is sufficiently well known in the prior art. However, here, special dynamic filters are used with a filter effect adapted to the recording data since these were created based on the respective recording parameters. The prefiltering preferably takes place in the frequency domain.

Reconstructing an image from the prefiltered recording data.

Reconstruction is sufficiently well known in the prior art where it is often also referred to as "back projection". However, the dynamic creation of the filters now provides an advantageous basic flavor.

According to the method according to an embodiment of the invention, reconstruction is thus preceded by the dynamic generation of filter kernels (for the preprocessing filters). These preprocessing filters are used to preprocess the projection recordings (their recording data) based on predetermined or measured physical parameters (the recording parameters). The reconstructed images are in particular slice images or 3D images. The recording data could also be referred to as "projection images" since they in each case represent projections of the object.

Since reconstruction of images is often performed directly in an imaging system, the method is also used to control an imaging system, namely its reconstruction components.

A prefilter-generating unit according to an embodiment of the invention is used to generate a preprocessing filter and is designed to process recording parameters with which recording data was created and to create preprocessing filters for the recording data based on the recording parameters and in particular to perform a method according to an embodiment of the invention.

In general, the preprocessing filters are calculated by the application of physical principles of X-radiation and mathematical principles of imaging geometry. In addition, further parameters that inter alia describe the target spatial resolution and/or the noise level are included.

A postfilter-generating unit according to an embodiment of the invention is used to generate a postprocessing filter and is designed to create postprocessing filters for a reconstructed image based on the recording data and/or prespecified flavors. In particular, the postfilter-generating unit generates postprocessing filters for adapting the noise and/or spatial resolution in different slices or slice ranges of reconstructed images based on the mathematical principles of imaging geometry. A postfilter-generating unit of this kind can in particular be provided in the form of a software module; it receives the required data and creates the relevant postprocessing filter(s) therefrom in dependence on the data.

A filter-generating unit can preferably be embodied to be able to generate preprocessing filters and postprocessing filters, i.e., as a prefilter-generating unit and a postfilter-generating unit.

A flavor is preferably generated via a flavor filter kernel. Such a flavor filter kernel is based less on physical parameters of an image recording and more on specifications relating to human vision and human information processing. Therefore, flavor filter kernels should be understood to mean kernels that establish a specific prespecified flavor. Slice images that occur due to convolution with a flavor filter kernel are also referred to as convolved flavored slices. The flavor filter kernel preferably has slice resolution compensation.

Examples of filters that are in particular based on recording parameters are base filters, geometry filters or moiré filters.

The apparatus according to an embodiment of the invention for reconstructing (in particular medical-technology) images from recording data comprises the following components:

A data interface designed to receive recording data and recording parameters with which the recording data was created.

Herein, the recording data can be provided in a memory apparatus or have been measured. A data interface of this kind is known.

A prefilter-generating unit designed to generate a preprocessing filter for the recording data based on the recording parameters.

A prefilter-generating unit of this kind can be provided as a software module, receives the provided or measured data on the recording parameters and creates the relevant preprocessing filter(s) therefrom in dependence on the data.

A prefilter unit, designed to prefilter the recording data with the preprocessing filter.

A prefilter unit of this kind is known.

A reconstruction unit designed to reconstruct an image from the prefiltered recording data.

A reconstruction unit of this kind is likewise known.

Optionally, in at least one embodiment: a postfilter-generating unit designed to generate a postprocessing filter for a reconstructed image based on the recording data and/or prespecified flavors (i.e., the data for the generation thereof).

In particular, the postfilter-generating unit is designed to generate postprocessing filters for the adaptation of the noise and/or spatial resolution of images. They are preferably designed for adaptation in this respect in different slices or slice ranges of reconstructed images based on the mathematical principles of imaging geometry. A postfilter-generating unit of this kind can be provided as a software module; it receives the required data and creates the postprocessing filter(s) therefrom in dependence on the data.

Optionally, in at least one embodiment a postfilter unit designed to postfilter a reconstructed image with the postprocessing filter, preferably wherein the images are transformed and the convolution takes place in a frequency domain.

A control facility according to at least one embodiment of the invention for controlling an image-taking system (preferably based on the principle of tomography), in particular a tomosynthesis system or a computed tomography system, is designed to perform a method according to at least one embodiment of the invention and/or comprises an apparatus according to at least one embodiment of the invention.

An image-taking system according to at least one embodiment of the invention is based on the principle of tomography (and is in particular a tomosynthesis system or a computed tomography system) and comprises a control facility according to at least one embodiment of the invention.

A large part of the aforementioned components of the apparatus or the control facility can be implemented completely or partially in the form of software modules in a process of a corresponding apparatus or control facility. An extensively software-based implementation has the advantage that it is also possible to retrofit apparatuses or control facilities used to date in a simple way by a software update in order to work in the manner according to the invention. Insofar, the object is also achieved by a corresponding computer program product with a computer program which can be loaded directly into a computing system or a memory facility of a control facility, with program sections for executing all the steps of the method according to the invention when the program is executed in the computing system or the control facility. In addition to the computer program, a computer program product of this kind can optionally comprise additional parts such as, for example, documentation and/or additional components and also hardware components, such as, for example, hardware keys (dongles etc.) for using the software.

Transportation to the computing system or to the control facility and/or for storage on or in the computing system or the control facility can take place via a computer-readable medium, for example a memory stick, a hard disk or another kind of transportable or integrated data carrier on which the program sections of the computer program that can be read and executed by a computing system or a computing unit of the control facility are stored. For this purpose, the computing unit can, for example, have one or more interacting microprocessors or the like.

Further particularly advantageous embodiments and developments of the invention emerge from the dependent claims and the following description, wherein the claims of one category of claims can also be developed in a similar way to the claims and descriptive passages to create another category of claims and in particular individual features of different example embodiments or variants can be combined to create new example embodiments or variants.

According to a preferred embodiment of the method, the recording parameters comprise variables from the group:
pulse duration,
dose,
angular velocity of the X-ray tube during the acquisition of the raw data for recording
angular velocity of the detector during the acquisition of the raw data for recording,
recording geometry, in particular the distance to the X-ray detector and/or angle of the beam direction and detector properties and preferably also
parameters for conditioning raw data (for creating the recording data).

For example, a longer X-ray pulse duration often means greater smearing in the direction of movement and thus lower spatial resolution at the same time as a higher dose and hence less noise. A low dose increases the noise. The distance to the detector influences differences in spatial resolution. Conditioning parameters can result in systematic changes in the image.

According to a preferred embodiment of the method, in the course of the generation of the preprocessing filter, this is designed to compensate physical factors of the acquisition and/or conditioning of the recording data based on the recording parameters. Herein, preferably a preprocessing filter should be generated such that standardization of the resulting spatial resolution and/or standardization of the noise in the recording data is achieved. Noise can be standardized particularly well with a filter kernel based on the applied dose (as a recording parameter), for example measured via the tube current or the measuring chamber. Spatial resolution can be standardized particularly well based on the (possibly measured) angular position (of the tube and/or detector) in combination with further relevant information about the position of the tube, detector and object (as recording parameters).

According to a preferred embodiment of the method, in the course of the generation of the preprocessing filter, a number of filter matrices are calculated based on the recording parameters and/or created from a manipulation of previously known filter matrices based on the recording parameters. It should be noted that it is also possible to apply a plurality of preprocessing filters in the course of the method, wherein each preprocessing filter can correspond to one of these filter matrices. However, it can be advantageous (in particular with respect to computer time), to create a single preprocessing filter from a plurality of filter matrices.

In this regard, preferably at least two filter matrices based on different recording parameters are generated and combined with one another to form the preprocessing filter, preferably via convolution. This is possible for filter matrices both in one spatial dimension (x or y direction) and in 2D (x and y direction).

According to a preferred embodiment of the method, the preprocessing filter in particular comprises at least one filter matrix created to generate the preprocessing filters is, or comprises, a frequency filter. Preferred frequency filters are low-pass filters, band-pass filters, filters for boosting frequency ranges or filters for amplifying predetermined frequency ranges (wherein, as already stated, "amplification" can also be negative and thus achieve attenuation).

As stated, a longer X-ray pulse duration frequently means motion blur with less noise. Shorter pulses achieve better resolution with higher noise. Depending on the target resolution, images from short pulses are, for example, smoothed (low-pass filter), while with long pulses, certain frequencies are still amplified.

At least one embodiment of the invention has the particular advantage that it is possible to separate flavor and adaption of the image data to physical influences (angle, dose, detector etc.). While up to now, the subject has been the adaption of the image data to physical influences, the following embodiments relate to the generation of a particular flavor.

According to a preferred embodiment of the method, after the reconstruction, postprocessing, in particular convolution of a reconstructed image is performed via a postprocessing filter. Herein, in the course of the postprocessing, image regions are preferably emphasized or reduced or amplified in different ways (positively or negatively) according to a predetermined scheme. Herein, the images are preferably transformed and the postprocessing (for example the convolution) takes place in a frequency domain.

For this purpose, a preferred apparatus comprises a postprocessing unit designed to postprocess the reconstructed image via a postprocessing filter, preferably wherein the images are transformed and the postprocessing (for example the convolution) takes place in a frequency domain.

It should be noted that (as already indicated above) the postprocessing filters are calculated based on the mathematical principles of imaging geometry. Herein, the calculations can comprise data on the recording parameters from which, for example, it is possible to derive information on noise or spatial resolution, or data on preset flavors desired by a viewer. The postprocessing filters are preferably calculated for an adaptation of the noise and/or an adaptation of the spatial resolution in a reconstructed image. Here, it should be noted that, in particular in medical cases, 3D-images are often present in the form of a stack of slices and therefore the postprocessing filters are calculated such that they can act on these different slices or on slice ranges.

The data on the flavors can be fixed and a user preferably selects desired flavors, but they can also have been created individually by a user in advance. The important thing is that they are available to the method. Since postprocessing takes place after the reconstruction, data on flavors can also only be available after the reconstruction. A user can even carry out postprocessing, see if the result was as desired and, if necessary, specify new data for calculating a postprocessing filter and carry out further postprocessing.

In this regard, preferably, at least two filter matrices based on different recording parameters or flavors are generated and combined with one another to form the postprocessing filter, preferably via convolution. This is possible for filter matrices in one spatial dimension (x or y direction) and in 2D (x and y direction).

According to a preferred embodiment of the method, the postprocessing filter, in particular at least one filter kernel created to generate the postprocessing filters (this is a filter matrix), comprises a frequency filter. Preferred frequency filters are low-pass filters, band-pass filters, filters for boosting frequency ranges or filters for amplifying predetermined frequency ranges (wherein, as already stated, "amplification" can also be negative and thus achieve attenuation).

In general, it is preferred for the preprocessing and/or for the postprocessing that filtering takes place in the frequency domain. Suitable transforms of the recording data or image data are known to the person skilled in the art, for example a (fast) Fourier transform, a wavelet transform or a transform based on a Gauss/Laplace pyramid.

According to a preferred embodiment of the method, in the course of the postprocessing (for example the convolution), different spatial resolutions are adapted in different regions of the (reconstructed) image, in particular if these cannot be compensated by convolution of the projection images. This is preferably done via a low-pass filter dependent upon the magnification factor, wherein the filter is preferably designed to achieve relative compensation of the spatial resolution and in particular also of the noise.

Due to the principle involved, in tomosynthesis, for example, the reconstructed slices have a different spatial resolution depending on the distance to the tube and detector (=magnification factor). This can, for example, also be compensated by a light low-pass filter (as a postprocessing filter) that is dependent upon the magnification factor so that, when viewed, the slices have as uniform spatial resolution as possible as well as uniform noise. Here, there is a tendency for relative compensation, but absolute compensation can also be useful. This would, for example, be the case if the reconstructed slices are also to be used as a source for further steps, such as synthetic 2D image generation and herein the best possible (or at least higher) spatial resolution is to be achieved.

According to a preferred embodiment of the method, in the course of the postprocessing, a predetermined flavor is generated. In the field of digital 2D radiography/mammography and also tomosynthesis, different flavors are the rule, i.e., there is no standard image, instead frequency ranges are individually emphasized or reduced and the dynamics in the image are adapted for a human viewer. This flavor varies between manufacturers, country regions, clinics and can also be adapted to the diagnostic issue or body region. A predetermined postprocessing filter is preferably used for this purpose, but particularly preferably a plurality of predetermined postprocessing filters are used and thus a plurality of (different) images are generated.

It should be noted that the resulting (reconstructed) image data without "flavor" is not optimal for a human viewer, since human vision can, for example, only distinguish a limited number of gray values and perceives certain properties (independently of the information content) as pleasant or unpleasant. The flavor is used to attempt to make the "raw" image easier for humans to understand. Since this also depends on habits and personal taste, there is generally a plurality of different flavors to choose from.

The flavors are generally designed or adapted by hand by specialists working for the manufacturer, or even by users. However, this process can also potentially include explicit knowledge about human perception in the form of an algorithm for generating the filters. All flavors are based on data (which can also be referred to as "flavor parameters"). These flavor parameters are the data on which a postprocessing filter is based when it is designed for a specific flavor or based on a flavor. The general technique for calculating a filter for the generating a prespecified flavor is known to the person skilled in the art.

The method is particular advantageous for generating synthetic projections, in particular mammograms (for example maximum intensity projection "MIP" or average intensity projection "AIP"). The images (after reconstruction) are independent of the final flavor generated with the postprocessing filters and can therefore also be referred to as "basic images". MIPs or AIPs are projection images which can either be alone or combined with one another or with the measured projection data. These can then be raw or provided with one or more flavors or reconstructed to form a volume data set and further processed.

AI based methods (AI: "artificial intelligence") are preferably used for the method according to the invention, in particular for creating the filters or filtering. Artificial intelligence is based on the principle of machine-based learning and is generally performed with an algorithm capable of learning that has been trained appropriately. Machine-based learning is frequently referred to as "machine learning" and frequently also comprises the principle of "deep learning". For example, a deep convolutional neural network (DCNN) is trained to filter images or to create filter matrices from recording parameters.

Components of embodiments of the invention are preferably provided as a "cloud service". Such a cloud service is used to process data, in particular via artificial intelligence, but can also be a service based on conventional algorithms or a service in which evaluation by humans takes place in the background. In general, a cloud service (hereinafter, also called a "cloud" for short) is an IT infrastructure in which memory, computing power and/or application software is provided via a network, for example. Herein, communication between the user and the cloud takes place via data interfaces and/or data transfer protocols. In the present case, the cloud service particularly preferably provides both computing power and application software.

In the course of a preferred embodiment of the method, recording data and recording parameters are provided to the cloud service via the network. This comprises a computing system, for example a computer cluster, which generally does not include the user's local computer. This cloud can in particular be provided by the medical facility that also provides the medical-technology systems. For example, data from an image recording is sent via a RIS (radiology-information system) or PACS to a (remote) computer system (the cloud). Preferably, the cloud's computing system, the network and medical-technology system constitute a cluster in the sense of data technology. Herein, the method can be realized in the network via a command constellation. The data calculated in the cloud ("result data") is later sent back to the user's local computer via the network.

It is advantageous that an embodiment of the suggested method can largely compensate physical effects relating to image resolution and image noise during preprocessing. Remaining geometric effects can be compensated on the reconstructed slice images resulting in uniform spatial resolution or noise texture. In the methods used to date, the effects were only partially compensated and this resulted in greater deviations in the image quality. Separating the basic flavor (by prefiltering) and final flavor (by postfiltering) allows the application of multiple flavors without having to repeat the actual reconstruction. This enables the creation of a plurality of individual flavors with only very little additional computing effort for different human or machine researchers, for example. Furthermore, data for the generation of synthetic projections, in particular mammograms (MIPs or AIPs) can be generated independently of the final flavor without additional computing effort.

In the following explanations, it is assumed that the imaging system is a tomosynthesis system. In principle, however, the method can also be used on other imaging systems, for example on a computed tomography system.

Figure 1:
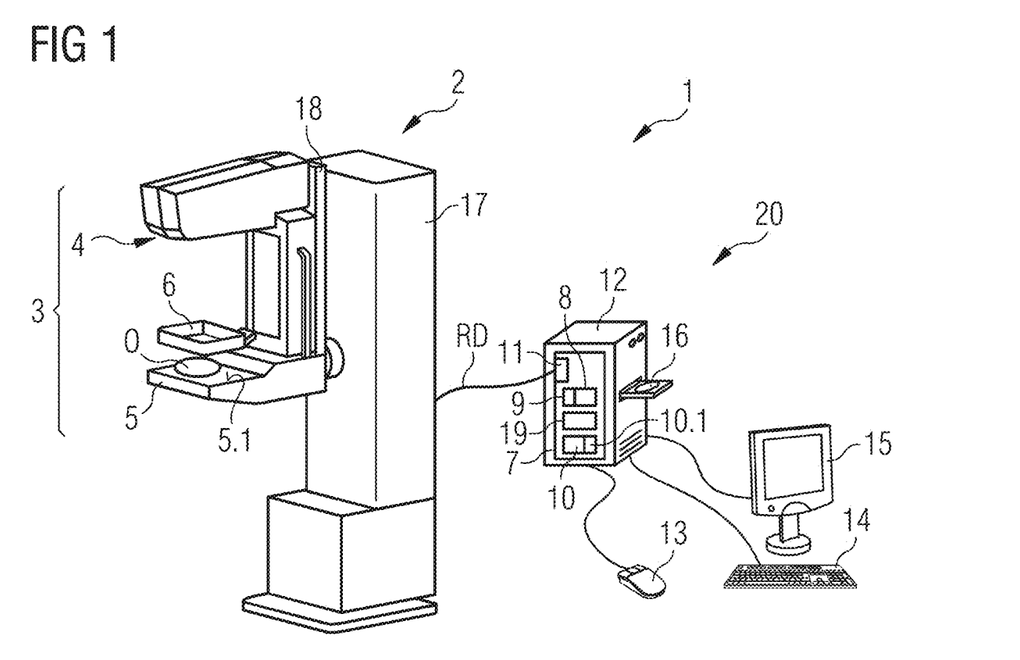
FIG. 1 shows a rough schematic depiction of an embodiment of a preferred tomosynthesis system with an embodiment of a preferred apparatus.

FIG. 1 shows an example and rough schematic depiction of a tomosynthesis system 1. Relative directional indications such as "above", "and" etc. relate to a tomosynthesis system 1 set up for operation as intended. The tomosynthesis system 1 comprises a tomosynthesis device 2 and a computer system 20. The tomosynthesis device 2 has a vertical column 17 and a source-detector arrangement 3, which in turn comprise an X-ray source 4 and a detector 5 with a detector surface 5.1. In operation, the vertical column 17 stands on the ground. The source-detector arrangement 3 is connected to it in a displaceable manner so that the height of the detector surface 5.1, i.e., the distance to the ground can be set at the height of a female patient's breast.

A patient's breast O (depicted schematically here) rests on the upper side of the detector surface 5.1 as an examination object O for an examination. A plate 6, which is connected in a displaceable manner with the source-detector arrangement 3 is arranged above the breast O and the detector surface 5.1. For the examination, the breast O is compressed and fixed at the same time in that the plate 6 is lowered onto the breast so pressure is exerted on the breast O between the plate 6 and the detector surface 5.1.

The X-ray source 4 is arranged opposite the detector 5 and embodied such that the detector 5 acquires X-rays emitted thereby when at least some of the X-rays have penetrated the patient's breast O. Therefore, projections of the breast O are acquired as projection data in projection data sets. Herein, the X-ray source 4 can be pivoted relative to the detector 5 via a rotary arm 18 in a range of ±50° about a basic position in which it is arranged perpendicularly above the detector surface 5.1.

The computer system 20 comprises an image-sequence generating facility 12 (a computing unit) with a mouse 13, keyboard 14 and screen 15 each connected to the facility. Here, the screen 15 serves as a display unit 15, while the mouse 13 and keyboard 14 each serve as input devices. The image-sequence generating facility 12 comprises a data interface 11 and an apparatus 7 according to the invention (here, depicted schematically as blocks) and a drive 16 for reading CDs or DVDs. Herein, the data interface 11 and the apparatus 7 can jointly use components of the image-sequence generating facility 12, such as, for example, memories, processors and the like. The computer system 20 can be arranged in the same room as the tomosynthesis device 2, but it can also be located in an adjacent control room or even further away.

In this example, the image-sequence generating facility 12 is designed to perform a method according to the invention (see, for example, the following figures) and comprises an apparatus 7 according to the invention for reconstructing medical-technology images B from recording data A (which, in this example, correspond to the raw data RD). The apparatus comprises a data interface 11 for receiving the raw data RD as recording data A and the recording parameters P with which the recording data A was created. Furthermore, the apparatus comprises a prefilter-generating unit 9 which, in this example is contained in a prefilter unit 8. Therefore, here, the preprocessing filters VF for preprocessing are generated within the prefilter unit 8 by the prefilter-generating unit 9. The images B prefiltered by the prefilter unit 8 are reconstructed via a reconstruction unit 19 and then in this example postprocessed by an (optional) postfilter unit 10 in order, for example, to obtain individual flavors B1, B2. Here, the postfilter unit (10) comprises a postfilter-generating unit 10.2 able to dynamically generate postfilters NF.

Figure 2:
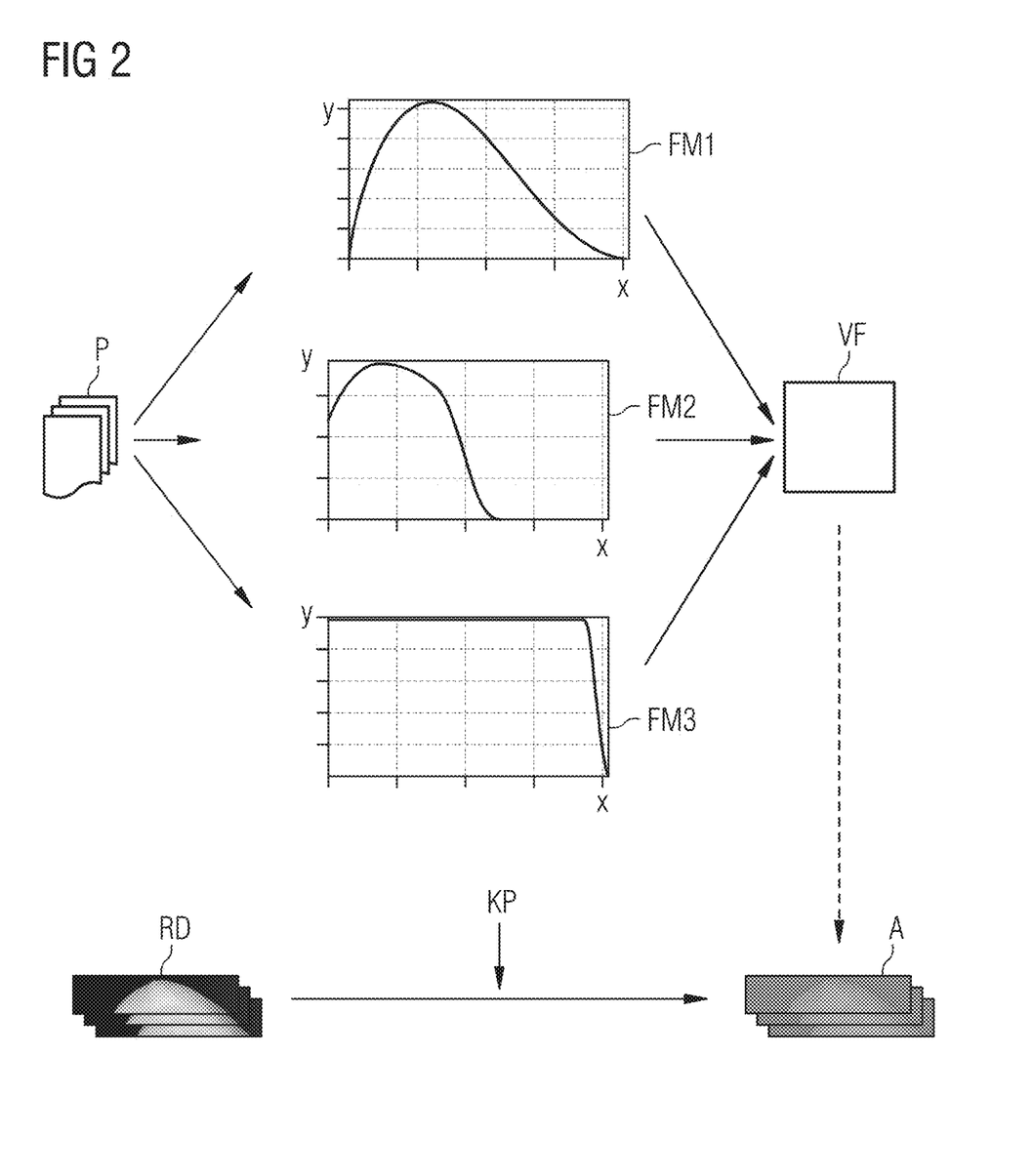
FIG. 2 shows the generation of a preprocessing filter and recording data.

FIG. 2 shows the generation of a preprocessing filter VF by a preferred prefilter-generating unit 9 and of recording data A. An image is taken with the recording parameters P and thus raw data RD is generated. These recording parameters P can be present as data in the image-taking device 1 and can be easily called up, but they (or some of the recording parameters P) can also be measured, for example the intensity of the beam with the detector 5 from FIG. 1 or a free part of the detector surface 5.1.

The raw data RD can now be used unchanged as recording data A, but can also be conditioned via conditioning parameters KP, for example pixel calibration or compensation of defective pixels can be performed. These conditioning parameters KP can also be adopted in the recording parameters P. The conditioned raw data RD is then the recording data A.

Based on the recording parameters P, in this example, three filter matrices F1, F2, F3 ("filter kernels" or "kernels") are created. For example, the first filter matrix FM1 is a basic filter kernel, the second filter matrix FM2 is a geometry filter kernel and the third filter matrix FM3 is a moiré filter. Even if each of these filter matrices F1, F2, F3 can serve as a preprocessing filter VF, here they are combined to form a preprocessing filter VF, preferably via convolution.

The x axis of the filters relates to a measure relating to the pixels or the image, for example a frequency or a pixel spacing, the y axis relates to an amplification factor of the intensity, for example of the gray value (wherein factors<1 which cause attenuation are also possible).

In the course of the method, the preprocessing filter VF acts on the recording data A as indicated by the dashed arrow.

Figure 3:
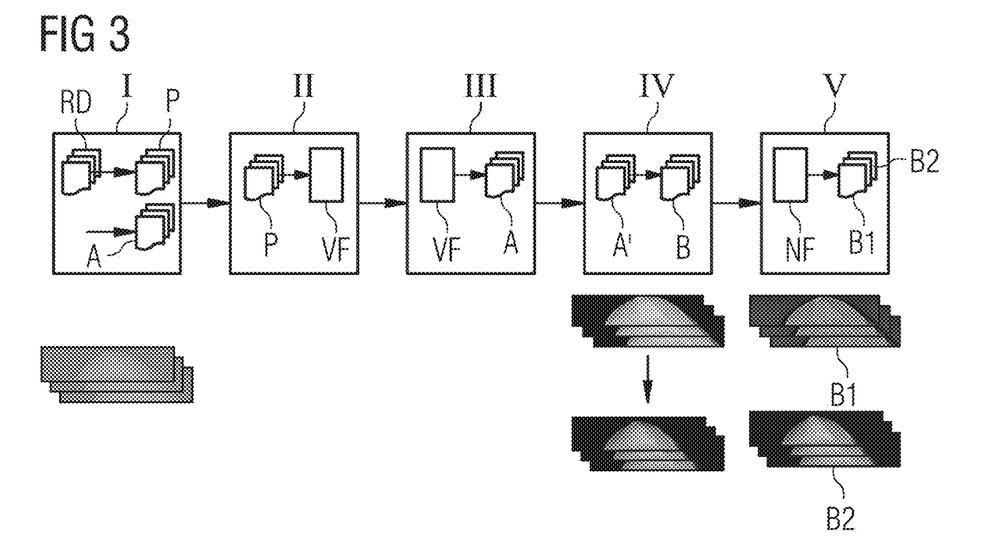
FIG. 3 shows a flow chart for a possible sequence of a method according to an embodiment of the invention.

FIG. 3 shows a flow chart of a possible sequence of a method according to an embodiment of the invention for reconstructing (in particular medical-technology) images B from recording data A.

Step I is the provision of recording data, here conditioned raw data, and recording parameters P with which the recording data A was created. An example of the recording data A is shown below. The recording parameters P can comprise parameters such as, for example, pulse duration, dose, angular velocity of the X-ray tube 4 or the detector 5, recording geometry, and preferably conditioning parameters KP.

Step II is the generation of a preprocessing filter VF based on the recording parameters P such as shown, for example, in FIG. 2. The preprocessing filter VF should be designed such that physical factors of acquisition and/or conditioning of the recording data A are compensated based on the recording parameters P. Preferably, the preprocessing filter VF achieves standardization of the noise or the resulting spatial resolution.

Step III is the prefiltering of the recording data A with the preprocessing filter VF.

Step IV is the reconstruction of an image B from the prefiltered recording data (A'). In a further step, synthetic projection images can, for example, be created from the reconstructed images B, as indicated by the arrow between the images below the box.

Step V is postprocessing, in particular convolution, of the reconstructed image B via a postprocessing filter NF. Herein, the images B are preferably transformed and postprocessing takes place in a frequency domain. In the course of the postprocessing, preferably different spatial resolutions are adapted in different areas of the image B and here two predetermined flavors B1, B2 are generated (see the two images below the box).

One of the flavors B1 can, for example, contain "convolved flavored" slices, another flavor B2 can contain dynamically compressed slices. This can, for example, be achieved via flavor filter kernels with slice resolution compensation as postprocessing filters NF.

Figure 4:
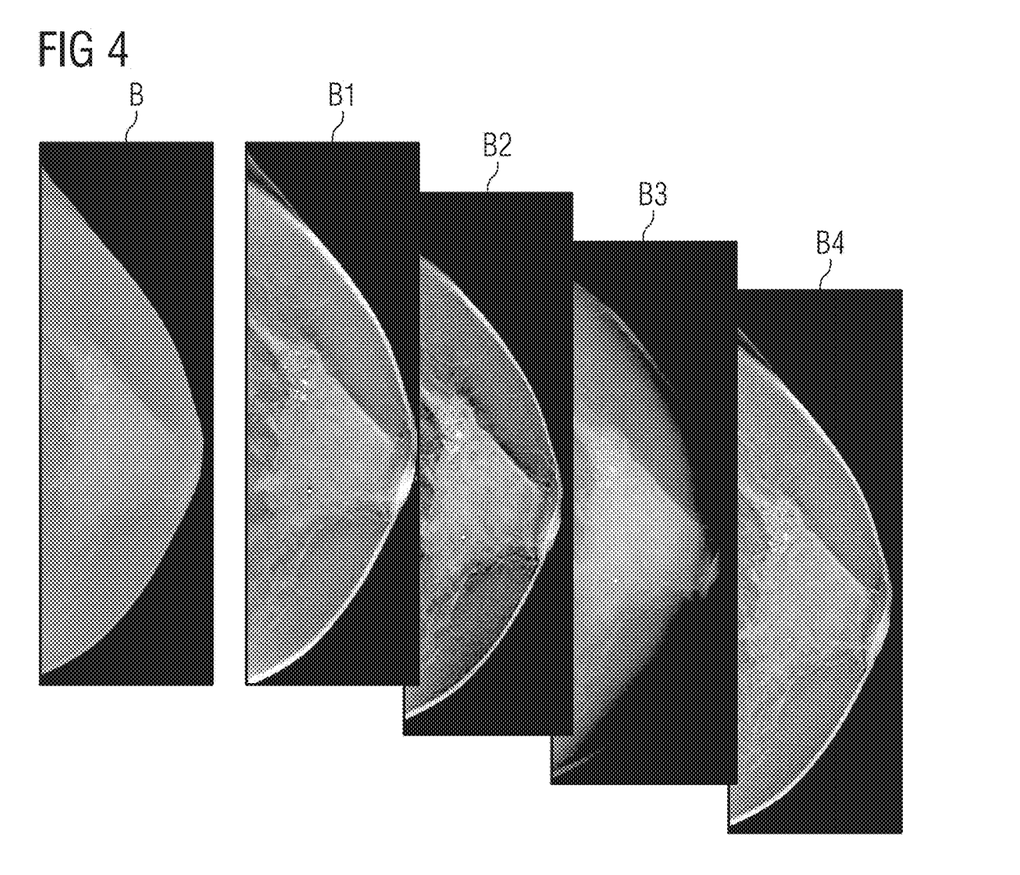
FIG. 4 shows possible results of a method according to an embodiment of the invention.

FIG. 4 shows some possible results of a method according to an embodiment of the invention. Herein, image B, after the reconstruction, (back projection) is shown on the left. Thus, it has already gone through preprocessing and constitutes a basic image which can now be postprocessed as required. It is no longer necessary to use the entire computing time required for reconstruction for the postprocessing.

To the right of the basic image, there is a depiction of four different flavors B1, B2, B3, B4 which could be generated with minimal computing effort, since they could all be created directly from the basic image.

Finally, reference is made once again to the fact that the method described in detail above and the apparatuses depicted are only example embodiments which can be modified by the person skilled in the art in a wide variety of ways without departing from the scope of the invention.

Furthermore, the use of the indefinite article "a" or "an" does not preclude the possibility of the features in question also being present on a multiple basis. Similarly, the use of the terms "unit" and "module" does not preclude the possibility of the components in question consisting of a plurality of interacting subcomponents which could also be spatially distributed.

Although the invention has been illustrated and described in detail by the preferred embodiments, the invention is not limited by the disclosed examples and other variations can be derived herefrom by the person skilled in the art without departing from the scope of protection of the invention.

Even if not explicitly stated, individual example embodiments, or individual sub-aspects or features of these example embodiments, can be combined with, or substituted for, one other, if this is practical and within the meaning of the invention, without departing from the present invention. Without being stated explicitly, advantages of the invention that are described with reference to one example embodiment also apply to other example embodiments, where transferable.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for reconstructing a plurality of image slices from recording data, comprising:
providing or measuring recording parameters with which the recording data was created, the recording parameters including at least one parameter involving at least one of pulse duration, dose, or recording geometry;
generating a preprocessing filter for the recording data based on the recording parameters, the generating the preprocessing filter configured to achieve standardization of a resulting spatial resolution of the recording data;
prefiltering the recording data with the preprocessing filter, to create prefiltered recording data;
reconstructing the plurality of image slices from the prefiltered recording data; and
postprocessing, after the reconstructing, the plurality of image slices via a postprocessing filter, wherein
the generating the preprocessing filter standardizes the resulting spatial resolution of the recording data based on an angular position of at least one of an X-ray tube or a detector in combination with further relevant information about a position of the X-ray tube, the detector, and an object, and the postprocessing results in a uniform spatial resolution and a uniform noise across the plurality of image slices.

2. The method of claim 1, wherein the recording parameters further include angular velocity of at least one of the X-ray tube or the detector during acquisition of raw data for recording.

3. The method of claim 2,
wherein the generating of the preprocessing filter is designed to compensate physical factors of at least one of acquisition and conditioning of the recording data based on the recording parameters, and
wherein the generating of the preprocessing filter is further done such that
standardization of noise based on an applied dose is achieved in the recording data.

4. The method of claim 2, wherein the recording parameters include at least one parameter further involving at least one of:
a distance to at least one of the detector, an angle of a beam direction, and detector properties; and
parameters for conditioning raw data for creating the recording data.

5. The method of claim 1, wherein the generating of the preprocessing filter includes calculating a number of filter matrices based on at least one of the recording parameters or creating the number of filter matrices from a manipulation of previously known filter matrices based on the recording parameters.

6. The method of claim 5, wherein at least two filter matrices are generated based on different recording parameters and combined via convolution.

7. The method of claim 1, wherein the preprocessing filter is or includes a frequency filter for boosting frequency ranges or for amplifying frequency ranges.

8. The method of claim 1, wherein, in the postprocessing, different spatial resolutions in different areas of the image are adapted.

9. The method of claim 8, wherein, in the postprocessing, different spatial resolutions in different areas of the image are adapted via a low-pass filter dependent upon a magnification factor, and wherein the postprocessing filter is designed to achieve a relative compensation of spatial resolution.

10. The method of claim 1, wherein, in a convolution, a flavor is generated, and wherein the postprocessing filter is applied, and wherein a plurality of images are generated with the postprocessing filter.

11. A non-transitory computer program product storing a computer program, directly loadable into a computing system, including program sections for executing all the method of claim 1 when the computer program is executed in the computing system.

12. A non-transitory computer-readable medium storing program sections, readable and executable by at least one processor, to execute the method of claim 1 when the program sections are executed by the at least one processor.

13. The method of claim 1,
wherein the generating of the preprocessing filter is designed to compensate physical factors of at least one of acquisition and conditioning of the recording data based on the recording parameters, and
wherein the generating of the preprocessing filter is further done such that standardization of noise based on an applied dose is achieved in the recording data.

14. The method of claim 1, wherein the postprocessing takes place in a frequency domain.

15. A filter-generating unit in a form of:
a prefilter-generating unit to generate a preprocessing filter designed to process recording parameters with which recording data was created and to create preprocessing filters for the recording data based on the recording parameters to achieve standardization of a resulting spatial resolution of the recording data, wherein the recording parameters include at least one of pulse duration, dose, or recording geometry and the preprocessing filter standardizes the resulting spatial resolution of the recording data based on an angular position of at least one of an X-ray tube or a detector in combination with further relevant information about a position of the X-ray tube, the detector, and an object, and
a postfilter-generating unit to generate a postprocessing filter to process at least one of recording parameters, with which the recording data was created, and to create postprocessing filters for reconstructed images, wherein the postprocessing filter adapts a spatial resolution and a noise of the reconstructed images by adapting a spatial resolution of slices of the reconstructed images, the slices of the reconstructed images being adapted to have a uniform spatial resolution and a uniform noise across the slices of the reconstructed images.

16. An apparatus for reconstructing a plurality of image slices from recording data, comprising:
a data interface to receive recording data and recording parameters with which the recording data was created, the recording parameters including at least one of pulse duration, dose, or recording geometry;
a prefilter-generating unit to generate a preprocessing filter for the recording data based on the recording parameters to achieve a standardization of a resulting spatial resolution of the recording data;
a prefilter unit to prefilter the recording data with the preprocessing filter, to create prefiltered recording data; and
a reconstruction unit to reconstruct the plurality of image slices from the prefiltered recording data to generate a plurality of reconstructed image slices, and
a postfilter unit to postprocess the plurality of reconstructed image slices via a postprocessing filter, wherein
the prefilter-generating unit is configured to generate the preprocessing filter to standardize the resulting spatial resolution of the recording data based on an angular position of at least one of an X-ray tube or a detector in combination with further relevant information about a position of the X-ray tube, the detector, and an object, and
the postprocessing results in a uniform spatial resolution and a uniform noise across the plurality of reconstructed image slices.

17. A control facility for controlling an image-taking system, comprising the apparatus of claim 16.

18. An image-taking system, comprising the control facility as of claim 17.

19. The apparatus of claim 16, further comprising:
a postfilter-generating unit, to generate a postprocessing filter for a reconstructed image based on at least one of the recording data and prespecified data on flavors.

20. The apparatus of claim 19, further comprising:
a postfilter unit designed to postfilter a reconstructed image with the postprocessing filter.

21. The apparatus of claim 16, further comprising:
a postfilter unit designed to postfilter a reconstructed image with a postprocessing filter.

22. The apparatus of claim 16, wherein the image is transformed and convolution takes place in a frequency domain.

* * * * *